(No Model.)
B. LIGGET.
THILL COUPLING.
No. 340,333.  Patented Apr. 20, 1886.
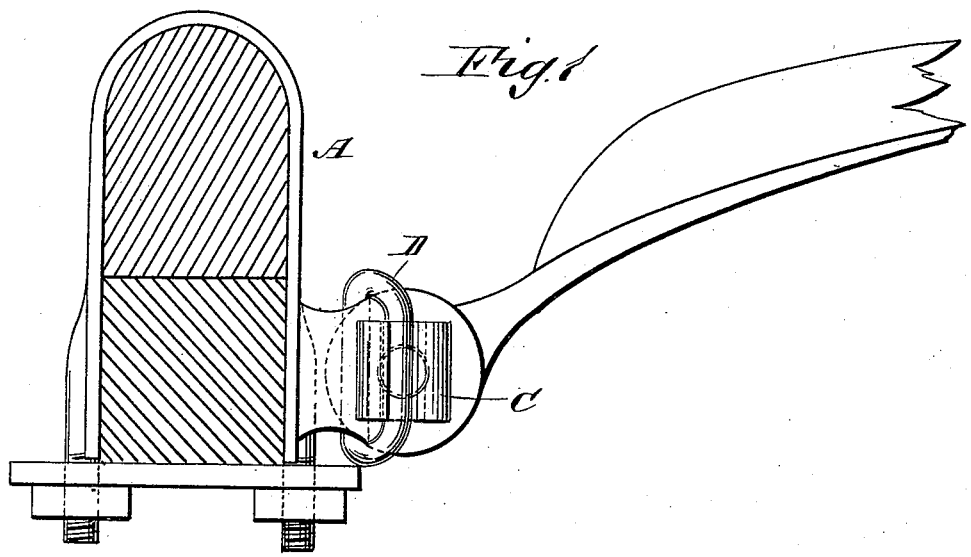
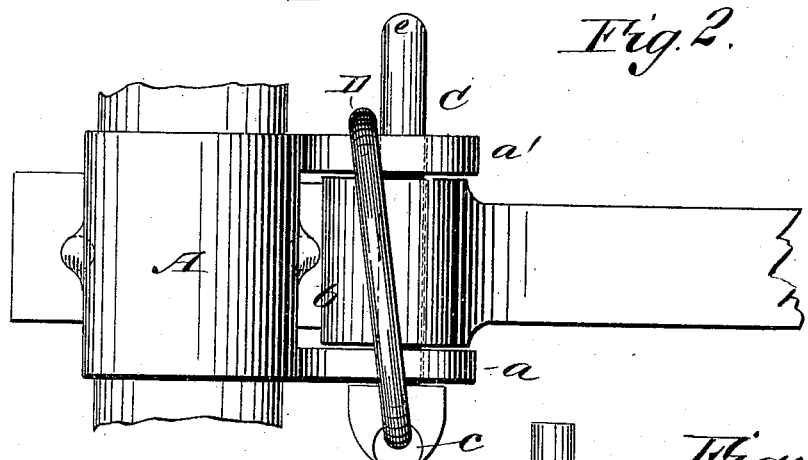
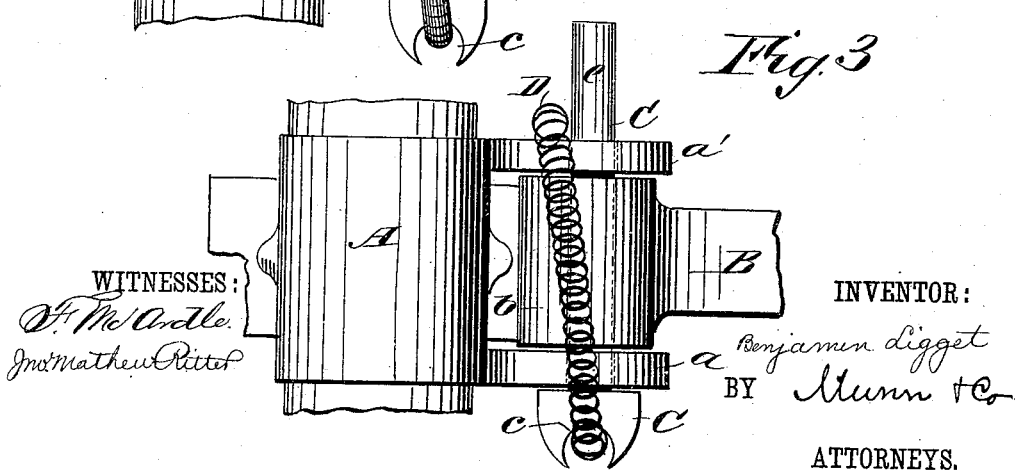
WITNESSES:
INVENTOR:
Benjamin Ligget
BY Munn & Co
ATTORNEYS.

UNITED STATES PATENT OFFICE.

BENJAMIN LIGGET, OF TUCSON, ARIZONA TERRITORY.

THILL-COUPLING.

SPECIFICATION forming part of Letters Patent No. 340,333, dated April 20, 1886.

Application filed July 21, 1885. Serial No. 172,202. (No model.)

*To all whom it may concern:*

Be it known that I, BENJAMIN LIGGET, of Tucson, in the county of Pima and Territory of Arizona, have invented a new and Improved Shaft-Coupling, of which the following is a full, clear, and exact description.

My invention relates to that class of devices employed for attaching shafts or poles to carriages, and its object is to do away with the ordinary form of bolt and nut; and to this end it consists of a bolt that is held in place by the action of a spring.

Reference is to be had to the accompanying drawings, forming a part of this specification, in which similar letters of reference indicate corresponding parts in all the figures.

Figure 1 is a side view of the device, showing it as applied to ordinary form of axle-clip. Fig. 2 is a plan view of the same, and Fig. 3 is a view of a modified form of spring.

A represents the ordinary form of axle-clip, having, as usual, the projecting lugs $a\ a'$, between which the eye $b$ of the shaft B is supported by the bolt C. This bolt C is formed with a recessed head, $c$, and is held in place by an endless spring-band, D, which rests in the recess $c$ and passes over and under the lugs $a\ a'$ and the eye $b$ and bears against the last-named lug, being prevented from displacement by the projecting end $e$ of the bolt C, which bolt will thus be securely held in position, but can be quickly and easily removed when it is desired to disconnect the shafts for any purpose—such, for instance, as to put in a pole in their place.

In Figs. 1 and 2 the band D is shown as being made of rubber, and this is the form of band I prefer; but a band such as is shown in Fig. 3 might be used.

In the figure just referred to the band D consists of a spiral spring, in which the ends of the wire are united to form a continuous spiral band.

I am aware that a bolt for a thill-coupling has been slotted at its head and point, and that a rubber band has been passed around the coupling and through the slots in the bolt. It will be noticed that my bolt is only slotted at its head, so that the band will constantly press the inner face of the head against one jaw of the clips and prevent rattling or accidental displacement. In the construction referred to the head of the bolt could not be pressed against the clip, as the band presses on both ends of the bolt. The bolt could not get out of place, but would rattle.

Having thus fully described my invention, I claim as new and desire to secure by Letters Patent—

The combination, with the clip A and eye $b$, of the bolt C, formed with a recessed head, $c$, and a solid point, $e$, and held in position by a band, D, which rests in the recess of the head $c$ and bears against one of the lugs of the clip A, back of the point $e$, substantially as described.

BENJAMIN LIGGET.

Witnesses:
H. D. UNDERWOOD,
JOS. F. TURNER.